UNITED STATES PATENT OFFICE.

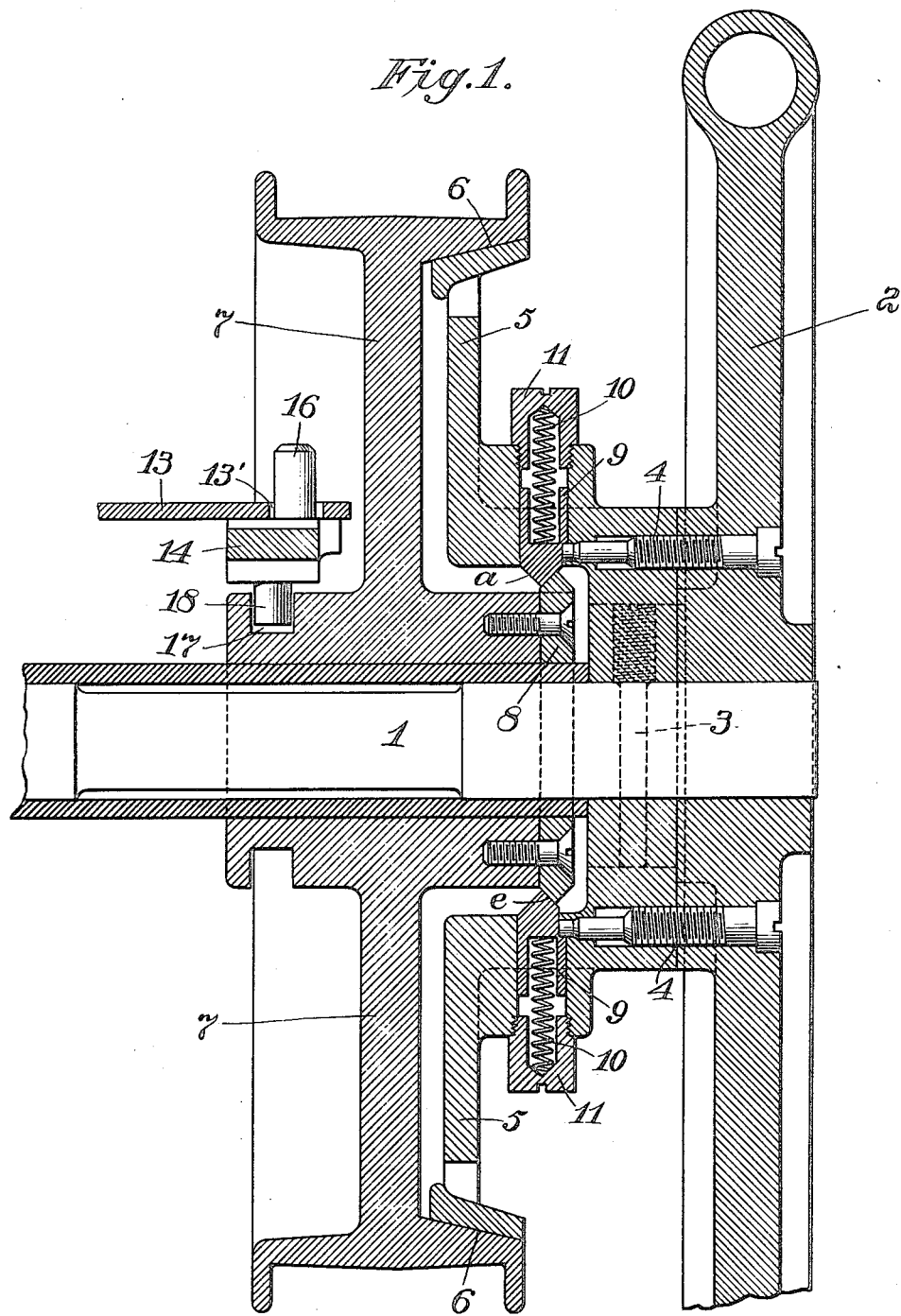

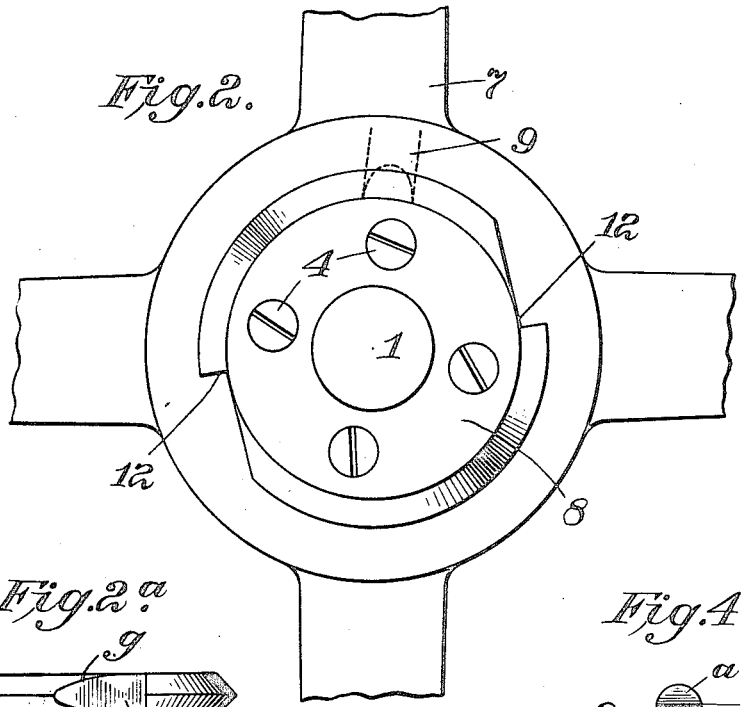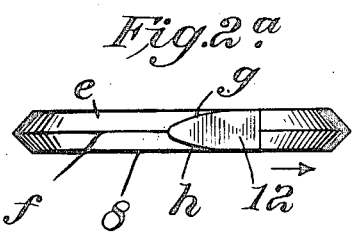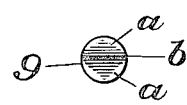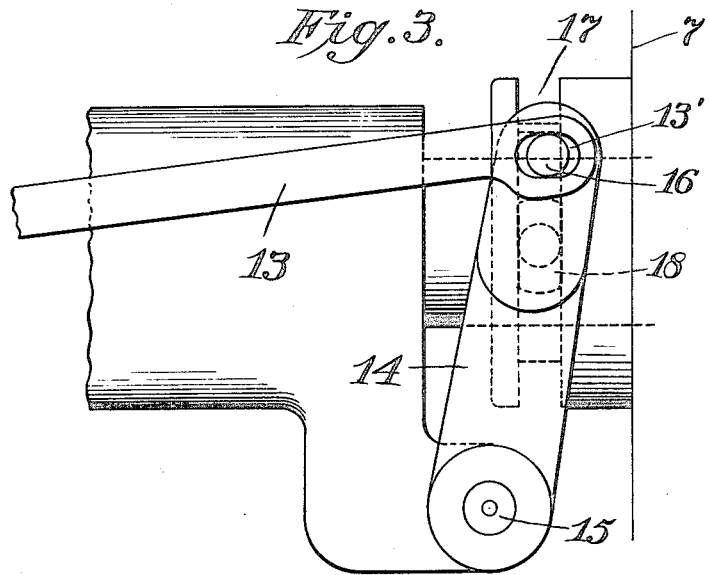

GEORGE L. BALLARD, OF NORRISTOWN, PENNSYLVANIA, ASSIGNOR TO WILDMAN MFG. CO., OF NORRISTOWN, PENNSYLVANIA, A CORPORATION OF PENNSYLVANIA.

CLUTCH.

1,224,997.  Specification of Letters Patent.  Patented May 8, 1917.

Application filed June 30, 1916. Serial No. 106,854.

*To all whom it may concern:*

Be it known that I, GEORGE L. BALLARD, a subject of the King of Great Britain, and resident of Norristown, Pennsylvania, have invented certain new and useful Improvements in Clutches, of which the following is a specification.

The invention relates to clutches of the friction variety and it includes means for retaining the movable member of the clutch in either locked or unlocked position.

The invention consists of the features and combination and arrangement of parts hereinafter described and particularly pointed out in the appended claims.

In the accompanying drawings;

Figure 1 is a sectional view of the clutch taken longitudinally along the shaft.

Fig. 2 is a face view of a part of the driving belt pulley, showing one of the controlling or locking members.

Fig. 2ª is an edge view of the said locking member.

Fig. 3 is a plan view of a part of Fig. 1 for showing more particularly the means for shifting the movable member of the clutch, in this instance the pulley.

Fig. 4 is a face view of one of the holding dogs.

In these drawings, 1 indicates the drive shaft of the machine to which the hand wheel 2 is fixed by a pin or screw 3. The hub of this hand wheel may be attached thereto in any suitable way, as by the screws 4 or by other screws. This hub carries the friction clutch rim or ring 5 of conical shape, adapted to be engaged by a corresponding surface 6 on the interior of the drive pulley 7 mounted to turn loosely on the shaft. The hub of the pulley carries a locking member 8 in the form of a disk having an edge of V-shape, to coact with locking means carried by the hub of the hand wheel, and consisting of dogs or plungers 9, slidable in pockets in the hub and pressed by springs 10 pocketed in the plungers and in cups 11, which are threaded into the hub of the hand wheel. The ends of the dogs or locking plungers are shaped to correspond to the bevels of the locking disk. The plungers have cylindrical body portions, which are slabbed off at the sides, making flat surfaces at *a*, as shown in Fig. 4, meeting at the center line *b*. The holding disk or cam 8 is provided with gates 12, these being formed by cutting away the V-shaped edge or crest of the disk down quite to the base of the V-shaped portion.

The pulley is thrown axially into and out of position for driving the machine, by a rod or link 13, operated by a suitable hand lever. The link 13 is connected with a lever 14, by a slot 13′ and pin 16. The lever is pivoted to the frame at 15 and has a pivotally connected block 18 entering a groove 17 in the hub of the pulley.

When the pulley is thrown into driving position the conical surface of the pulley is set into frictional driving contact with the conical surface of the hand wheel hub, and the hand wheel is thereby driven and this of course drives the shaft and the machine. When the driving pulley is thus moved axially the locking or holding disk or collar is moved past the spring plungers or dogs so that they lie against the inner inclined face of the V-shaped edge of the collar and the pulley therefore will be held locked to the driven member or hand wheel.

The V-shaped edge of the collar or disk is of considerable height and it would require too great power to force the disk past the dogs, especially when the parts are to be released automatically by the let-off or stop motion, which movement, as in ordinary practice is effected by a spring.

In order to secure ease of movement in throwing the clutch in and out I form the gates in the collar or disk locking member as before described, these being formed as before stated by cutting away the V-shaped edge down to the base thereof.

Now when the pulley is pressed axially toward driving position due to the operator actuating a hand lever (not shown) connected with the link 13, if the gates 12 do not happen to be in line with the dogs 9 the bevel face of the disk will simply bear on the bevel face of the dogs until the revolution of the disk brings the gates opposite the dogs, when said dogs will, relatively speaking, enter the gates and the axial movement of the pulley continuing as well as its revolution the center line of the V-shaped edge of the disk will be moved past the plane of the edge *b* of the dogs and said dogs will engage the inner beveled face *e* of the disk, Fig. 1, or in other words, the beveled face which is nearest the pulley and the spring pressure of the dogs acting on this face added to that exerted by the hand of the operator, if this is continued will cause the friction clutch surfaces 5 and 6 to be set in driving contact and the hand wheel thus will be driven, and the spring plungers will hold the parts in this driving relation. The link 13 is slotted at 13' where it engages the pin 16, so that the operator in operating the hand lever connected with the link can set the clutch members in driving contact and by throwing the lever slightly beyond its pivotal center, this being allowed by the slot 13', pressure of said link on the pin 16 is relieved and the parts now clutched will depend for the maintenance of their driving relation solely upon the plungers 9 acting by their spring pressure and through their bevel faces to hold the parts together. This will prevent wear on the block or projection 18 which extends from the lever 14 into the groove of the pulley and also prevent wear on the walls of the groove 17, for it will be observed that this block or projection no longer will be pressed against the walls of this groove owing to the relief afforded by the slot 13'.

In other words, the link and lever 14 with the projection or block 18 having set the parts in driving contact or having moved the disk to such a point that the center line of its circumference is outside of the plane of the edge $b$ of the dogs, no holding function need be and no such function is performed by the block 18 and grooved pulley hub, this being the office of the spring plungers which complete the setting or locking together of the parts 5 and 6 and which having performed this function rotate as one body with said parts and are thus not subjected to wear.

The spring dog having entered the gate and gotten into a position past the center line $f$ will run off from the gate across the line $g$ onto the inner beveled face $e$, bearing with its flat beveled face on said face $e$ and thus performing its locking or holding function.

In addition to relieving the parts 17, 18 of wear the construction described will relieve the shaft of end thrust and thus the member on said shaft, such as a gear, will be relieved of wear because it will not be pressed continually against its lateral bearing.

When the pulley is to be moved to idle position the hand lever is operated to start the movement. This will release the conical surfaces sufficiently to allow the pulley to run ahead far enough to bring its gate opposite the dog and thereupon the hand lever being further operated, the dog will ride in a relative sense, upon the surface 12 of the gate and will run off of the gate surface at some point along the edge $h$ and thus the dog will engage with the outer incline face of the V-shaped edge and the pressure resulting from the springs back of the dog will aid in or effect the full separation of the pulley from the opposing conical clutch surface.

What I claim is:

1. In combination in a clutch, two friction clutch members coaxially arranged, means for moving said clutch members relatively into contact and for separating them, and automatically operating means for locking the clutch members together against axial disengagement, said locking means tending to press the members relatively together axially, substantially as described.

2. In combination in a clutch two friction clutch members, means for opening and closing said members, and spring pressed locking means of wedge-like form for holding said members locked in driving contact, said holding means by their wedge-like action tending to force the members into close contact in the direction of their axes.

3. In combination in a clutch, two friction clutch members, means for moving said members toward or from each other axially, and means carried by one of the members for setting the members in driving contact by pressing one axially in relation to the other, said means also serving to lock the members together against axial displacement, substantially as described.

4. In combination in a clutch, two friction clutch members, means for relatively moving them toward or from each other and spring pressed means carried by one of the members for setting the members in driving contact by pressing one axially in relation to the other, said means also serving to lock the members together against axial displacement, substantially as described.

5. In combination in a clutch, two friction clutch members, means for relatively moving them toward or from each other, and interengaging wedging means on the members acting under spring pressure to set the members in driving contact by pressing one axially against the other, said wedge-means serving to lock the members against axial displacement.

6. In combination in a clutch, two friction clutch members, one of which is a driving member, means for moving one member axially toward and from the other, wedging means carried by one member having a gate or gates, and spring pressed wedging means carried by the other member and adapted to pass through the gates to engage the other wedging member for locking the two friction clutch members together, substantially as described.

7. In combination in a clutch, two friction clutch members, one of which is a driving member, means for moving one member axially toward and from the other, wedging means carried by one member having a gate or gates, and spring pressed wedging means carried by the other member and adapted to pass through the gates to engage the other wedging member for locking the two friction clutch members together, the gated wedging member having a beveled face and extending circumferentially of its carrier and the spring pressed wedging member consisting of a plunger having a beveled face to engage the beveled face first mentioned, substantially as described.

8. In combination in a clutch, two friction clutch members, one of which is a driver, a circumferentially extending rib or cam on one member having a beveled face, a spring plunger on the other member having a beveled face, and means for moving one of the friction clutch members axially to place the beveled faces of the rib and plunger in or out of line with each other, substantially as described.

9. In combination two friction clutch members arranged side by side, and one of which is a driver, one of said members having a circumferentially extending rib or cam of substantially V shape in cross section, and a spring plunger having a double beveled face, and means for moving one of the friction clutch members axially to place the beveled faces of the rib in or out of line with the correspondingly beveled faces of the plunger to hold the friction clutch members in or out of driving engagement, substantially as described.

10. In combination, two friction clutch members, one of which is a driver, one of said members having a rib or cam V-shaped in cross section and provided with a plurality of gates, a pair of spring plungers on the other member having beveled ends, and means for moving one friction member toward or from the other, to cause the spring plungers to hold the friction clutch members in locked or unlocked position, substantially as described.

11. In combination, two clutch members, means for moving them toward or from each other axially, said means having a loose connection, whereby said clutch members will be free from pressure therefrom, when set, and means carried by the members for locking them in driving contact against axial displacement when they are moved together, substantially as described.

12. In combination, two clutch members, means for moving them toward or from each other axially, said means having a loose connection, whereby said clutch members will be free from pressure therefrom, when set, and means carried by the members for locking them in driving contact when they are moved together, said first mentioned means including a slotted link, and a lever having a projection entering a groove in the hub of one of the members, substantially as described.

13. In combination two friction members coaxially arranged, means for moving them toward and from each other axially, one of said clutch members having a portion with a face extending at an inclination to the axis of the members and the other member having a radially yielding part under spring tension provided with an inclined face corresponding substantially to the inclined face of the part first mentioned, said inclined face parts when in engagement serving to lock the clutch members together and to exert a wedging action to press the members in opposite directions axially, substantially as described.

14. In combination two clutch members coaxially arranged, members having inclined faces to secure a wedging action and arranged one on one member and the other on the other member, said wedge-like members having relative movement in a direction transverse to the axis of the clutch members and having also relative movement with the clutch members in a direction axially of the clutch members and means for relatively moving the clutch members and simultaneously setting the wedge like members in position to exert pressure one upon the other to press one clutch member relatively to the other, substantially as described.

15. In combination two clutch members coaxially arranged, members having inclined faces to secure a wedging action and arranged one on one member and the other on the other member, said wedge like members having relative movement in a direction transverse to the axis of the clutch members and having also relative movement with the clutch members in a direction axially of the clutch members and means for relatively and initially moving the clutch members, and simultaneously setting the wedge-like members in position to exert pressure one upon the other to press one clutch member relatively to the other, said means which relatively and initially moves the clutch members being out of action when the wedge-like members are exerting their force.

16. In combination two clutch members coaxially arranged, members having inclined faces to secure a wedging action and arranged one upon one clutch member and the other upon the other clutch member, said inclined faced members having relative movement in a direction transverse to the axis of the clutch members and having also relative movement with the clutch members in a direction axially of the clutch members, and means for relatively moving the clutch members to or from each other and simultaneously setting the inclined face members in position to exert pressure one upon the other for locking the clutch members together or apart, substantially as described.

17. In combination, in a machine having rotary movement, two friction clutch driving members, one of the members being fixed to the part to be driven, the other being loosely mounted coaxially with the fixed member and adjustable into contact with said member, a clutch locking pawl or detent carried by one friction member, and a locking shoulder carried by the other member, said shoulder having a port or gate for the free passage of the locking detent and to switch it into separate paths for locking or unlocking the friction clutches.

In testimony whereof, I affix my signature.

GEORGE L. BALLARD.